United States Patent
Guillemot et al.

(10) Patent No.: US 9,714,308 B2
(45) Date of Patent: Jul. 25, 2017

(54) COPOLYMER FOR A HYDROPHOBIC COATING HAVING AN IMPROVED DURABILITY

(71) Applicants: SAINT-GOBAIN GLASS FRANCE, Courbevoie (FR); SPECIFIC POLYMERS, Castries (FR)

(72) Inventors: François Guillemot, Paris (FR); Cédric Loubat, Vendargues (FR)

(73) Assignees: SAINT-GOBAIN GLASS FRANCE, Courbevoie (FR); SPECIFIC POLYMERS, Castries (FR)

( * ) Notice: Subject to any disclaimer, the term of this patent is extended or adjusted under 35 U.S.C. 154(b) by 0 days.

(21) Appl. No.: 14/903,436

(22) PCT Filed: Jul. 3, 2014

(86) PCT No.: PCT/FR2014/051702
§ 371 (c)(1),
(2) Date: Jan. 7, 2016

(87) PCT Pub. No.: WO2015/004368
PCT Pub. Date: Jan. 15, 2015

(65) Prior Publication Data
US 2016/0159952 A1    Jun. 9, 2016

(30) Foreign Application Priority Data

Jul. 8, 2013 (FR) ..................... 13 56694

(51) Int. Cl.
| | | |
|---|---|---|
| *C03C 17/30* | (2006.01) |
| *C03C 17/32* | (2006.01) |
| *C03C 17/34* | (2006.01) |
| *C08F 220/22* | (2006.01) |
| *C08F 220/24* | (2006.01) |
| *C08F 220/18* | (2006.01) |
| *C08F 220/14* | (2006.01) |
| *C09D 133/12* | (2006.01) |
| *C09D 5/00* | (2006.01) |
| *C08F 220/38* | (2006.01) |
| *C08K 9/06* | (2006.01) |

(52) U.S. Cl.
CPC ............ *C08F 220/18* (2013.01); *C03C 17/32* (2013.01); *C03C 17/3405* (2013.01); *C08F 220/14* (2013.01); *C09D 5/00* (2013.01); *C09D 133/12* (2013.01); *C03C 17/30* (2013.01); *C03C 2217/76* (2013.01); *C08F 220/24* (2013.01); *C08F 220/38* (2013.01); *C08K 9/06* (2013.01)

(58) Field of Classification Search
CPC .... C08F 220/22; C08F 220/24; C08F 220/32; C08F 2220/325; C08F 220/34; C08F 2220/343; C08F 2220/382; C09D 127/12; C09D 133/062; C09D 133/068; C09D 133/12; C03C 17/32–17/3405
See application file for complete search history.

(56) References Cited

U.S. PATENT DOCUMENTS 5,081,165 A * 1/1992 Inukai ............... C09D 4/00
522/182
5,914,384 A * 6/1999 Anton ............... C08G 18/6279
428/421

FOREIGN PATENT DOCUMENTS

EP        0 849 283 A2    6/1998
IT        EP 1571165 A1 *  9/2005  ......... C09D 133/16

OTHER PUBLICATIONS

International Search Report as issued in International Patent Application No. PCT/FR2014/051702, dated Sep. 3, 2014.
International Preliminary Report on Patentability and the Written Opinion of the International Searching Authority as issued in International Patent Application No. PCT/FR2014/051702, dated Jan. 12, 2016.

* cited by examiner

*Primary Examiner* — Ramsey Zacharia
(74) *Attorney, Agent, or Firm* — Pillsbury Winthrop Shaw Pittman LLP

(57) ABSTRACT

A copolymer includes a first group that is hydrophobic and a second group that is crosslinkable. Moreover, a glass substrate includes a coating of the copolymer, with interposition of a layer of silane including a functional group capable of reacting with the crosslinkable group. The glass substrate may be used as hydrophobic glazing for a transport vehicle, shower cubicle wall or easy-to-clean interior glazing.

10 Claims, No Drawings

COPOLYMER FOR A HYDROPHOBIC COATING HAVING AN IMPROVED DURABILITY

CROSS-REFERENCE TO RELATED APPLICATIONS

This application is the U.S. National Stage of PCT/FR2014/051702, filed Jul. 3, 2014, which in turn claims priority to French patent application number 1356694 filed Jul. 8, 2013. The content of these applications are incorporated herein by reference in their entireties.

The present invention relates to the preparation of a hydrophobic coating on glass using a polymer layer, the composition of which is adjusted in order to obtain a good durability: hydrolytic, UV or mechanical. This coating can be applied to a motor vehicle glazing on the face exposed to the outside in order to improve the visibility during rain and to thus improve safety.

Saint-Gobain Sekurit currently produces motor vehicle side windows coated with a hydrophobic treatment under the Aquacontrol® registered brand. This coating is applied by the liquid route in the form of a two-layer system: a silica-based underlayer, in order to improve the durability, and a hydrophobic layer. The hydrophobic layer is a molecular monolayer of a fluorosilane, namely 1H,1H,2H,2H-perfluorodecylsilane.

A first route for improvement had the objective of developing a coating of the same type which can be applied on a windshield. The main problem in this case was to improve the mechanical and hydrolytic durability so as to be able to withstand the additional stresses on a windshield in comparison with the side windows.

A hydrophobic treatment based on a molecular layer of fluorosilane exhibits two major disadvantages which cause problems of durability:
- the molecules are bonded to the surface of the glass via an Si—O—Si bond. This type of bond exhibits the disadvantage of being hydrolyzable in a saline or basic medium. This frequently happens on a windshield on which water drops may stagnate;
- the treatment is based on just one layer of molecule (monomolecular layer); it is easily understood that, during aging, if a molecule were to become uncoupled from the surface, the site released is no longer functional; thus, any minor deterioration in the surface (scratch, hydrolysis, and the like) brings about a complete loss in functionality at the defect.

The invention intends to address in a different way the problem of the hydrophobic coating by developing a polymer material which contributes this hydrophobic functionality. Its molecular architecture is adjusted in order to obtain optimum properties in terms of hydrophobic functionality, of ease of processing, of hydrolytic durability, of stability under UV irradiation and finally of mechanical stability.

To this end, a subject matter of the invention is a copolymer of formula (I):

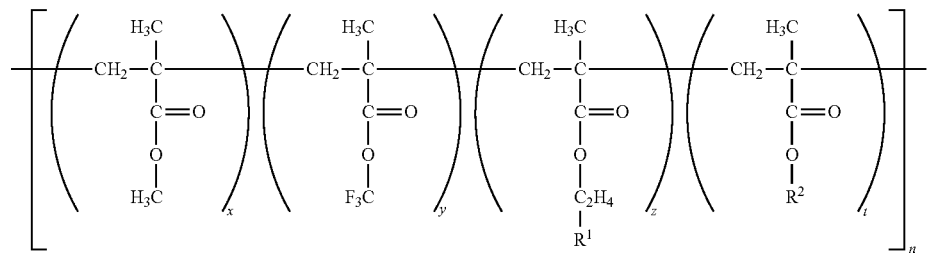

in which:
the $R^1$ group is hydrophobic,
the $R^2$ group is crosslinkable,
x, z and t>0 and y≥0 and x+y+z+t=1,
n is an integer.

The backbone of the polymer according to the invention is composed of four types of units resulting from four types of monomers:
- a polymethyl methacrylate (PMMA) base, the molar fraction of which is x;
- methacrylate components with a fluoromethyl group, contributing a portion of the hydrophobic functionality (molar fraction y);
- methacrylate links carrying the hydrophobic functionality, the molar fraction of which is z; this functional group can be of the $-(CF_2)_mCF_3$ (m=5, 7, 9, 11) form or of the $-OC(=O)CF(CF_3)-(OCF_2CF(CF_3))_p-F$ (p an integer between 2 and 10) form;
- methacrylate links carrying a crosslinkable group, the molar fraction of which is t; this group can carry an epoxide, mesyl, tosyl or isocyanate functional group.

According to the invention, the functionality is present at the surface of the coating but also in its body. Thus, it may be expected that, in the event of moderate deterioration, the coating will retain its hydrophobic functionality.

Another subject matter of the invention is a glass substrate comprising a coating of copolymer described above, with interposition of a layer of silane having a functional group capable of reacting with the crosslinkable $R^2$ group. The silane functional group is, in a known way, capable of bonding to the glass.

Finally, the mechanical properties of the copolymer coating can be improved by incorporating inorganic fillers therein. These inorganic fillers are generally silica nanoparticles. Their size is less than 50 nm in order not to render the coating optically scattering. Furthermore, the surface of these inorganic fillers can be functionalized in order to be able to react with the crosslinkable $R^2$ functional group of the copolymer.

Another subject matter of the invention is the application of the glass substrate described above as
hydrophobic glazing for a transport vehicle (ground, aerial or water, in particular motor vehicle);

shower cubicle wall; and
easy-to-clean interior glazing.

The invention is now illustrated by the following implementational example.

EXAMPLE a. Preparation of the Substrate

A glass substrate is activated beforehand by polishing with Cerox.

It is then functionalized with aminopropyltriethoxysilane. For this, use is made of an aqueous solution sold by Evonik, the concentration of which has been adjusted to 1% by weight. The solution is applied to the glass with a rag, the coating is dried at 110° C. for 15 min and any excess is removed by rubbing the glass with a rag impregnated with isopropanol.

b. Functional Layer

Use is made of the copolymer:

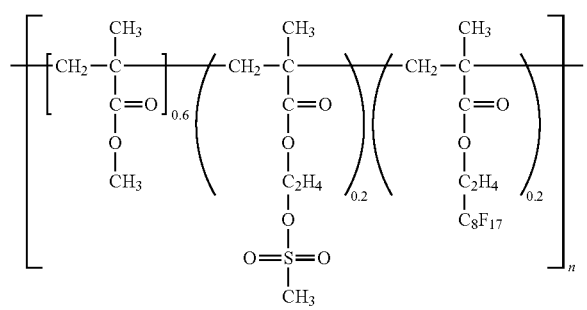

| Composition (mol %) | MMA: | 60% |
| | HEMA mesylate: | 20% |
| | Zonyl: | 20% |
| Composition (% by weight) | MMA: | 29% |
| | HEMA mesylate; | 20% |
| | Zonyl: | 51% |
| % by weight | Fluorine | 31% |
| Molecular weight Mn | | 16 500 g/mol |
| Molecular weight Mw | | 60 100 g/mol |
| Polydispersity index | | 3.7 |

MMA: Methyl methacrylate
HEMA: Hydroxyethyl methacrylate
Mesylate: SO$_2$CH$_3$
Zonyl: Fluorinated unit of the copolymer This copolymer is dissolved at 3% by weight in methyl ethyl ketone and deposited by spin coating (2000 revolutions per minute) on the functionalized substrate. The coating is crosslinked in an oven at 130° C. for 1 hour.

c. Properties

The contact angle with water measured on the functionalized substrate is measured at 114°.

After a neutral salt spray test for 72 hours, the contact angle measured is 103°.

After a test of exposure to UV radiation (WOM) for 400 hours, the contact angle measured is 105°.

It would have been possible to add, to the formulation, a dispersion of silica nanoparticles in methyl ethyl ketone in order to reinforce the so mechanical properties.

The invention claimed is:

1. A glass substrate comprising a coating of a copolymer of formula (I):

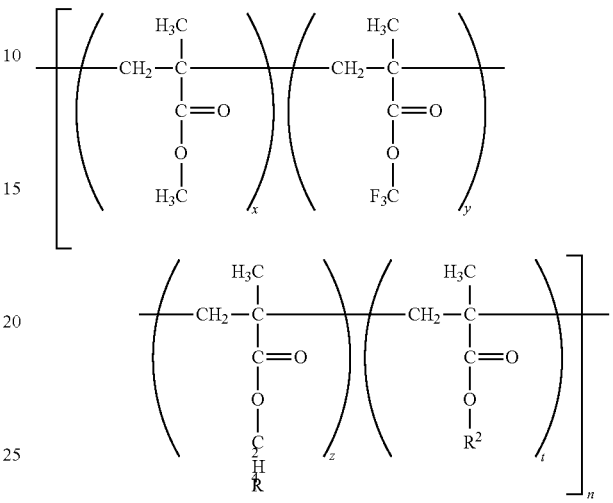

in which:
the R$^1$ group is hydrophobic,
the R$^2$ group is crosslinkable,
x, z and t>0 and y≥0 and x+y+z+t=1,
n is an integer, with interposition of a layer of silane having a functional group capable of reacting with the crosslinkable R$^2$ group.

2. The glass substrate as claimed in claim 1, wherein the copolymer coating comprises inorganic fillers.

3. The glass substrate as claimed in claim 2, wherein said inorganic fillers are silica nanoparticles.

4. The glass substrate as claimed in claim 2, wherein the surface of said inorganic fillers exhibits a functional group capable of reacting with the crosslinkable R$^2$ group.

5. A method comprising utilizing a glass substrate as claimed in claim 1 as hydrophobic glazing for a transport vehicle.

6. A method comprising utilizing a glass substrate as claimed in claim 1 as shower cubicle wall.

7. A method comprising utilizing a glass substrate as claimed in claim 1 as easy-to-clean interior glazing.

8. The glass substrate as claimed in claim 1, wherein the R$^1$ group is a —(CF$_2$)$_m$CF$_3$ group, with m=5, 7, 9 or 11, or a —OC(=O)CF(CF$_3$)(OCF$_2$CF(CF$_3$))$_p$F group, p being an integer between 2 and 10.

9. The glass substrate as claimed in claim 1, wherein the R$^2$ group carries an epoxide, mesyl, tosyl or isocyanate functional group.

10. The glass substrate as claimed in claim 1, wherein the R$^1$ group is a —OC(=O)CF(CF$_3$)(OCF$_2$CF(CF$_3$))$_p$F group, p being an integer between 2 and 10.

* * * * *